United States Patent
Fenkart et al.

(10) Patent No.: US 7,507,181 B2
(45) Date of Patent: Mar. 24, 2009

(54) METHOD FOR DETERMINING A DRIVING TORQUE CORRECTION FACTOR FOR COMPENSATING COOPERATING DRIVING TORQUES OF DIFFERENT DRIVE DEVICES

(75) Inventors: Marcel Fenkart, Munich (DE); Juergen Gebert, Moosburg (DE); Oliver Grohe, Waechtersbach (DE); Stephan Peuckmann, Germering (DE); Stefan Schinagl, Rochester Hills, MI (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/121,538

(22) Filed: May 15, 2008

(65) Prior Publication Data

US 2008/0210509 A1    Sep. 4, 2008

Related U.S. Application Data

(63) Continuation of application No. PCT/EP2006/011014, filed on Nov. 16, 2006.

(30) Foreign Application Priority Data

Nov. 18, 2005   (DE) ..................... 10 2005 055 001

(51) Int. Cl.
*B60W 10/18* (2006.01)
(52) U.S. Cl. ...................... 477/4; 477/9; 477/71
(58) Field of Classification Search ............ 477/4, 477/9, 71
See application file for complete search history.

(56) References Cited

U.S. PATENT DOCUMENTS 5,866,809 A    2/1999   Söderman
6,054,776 A    4/2000   Sumi (Continued)

FOREIGN PATENT DOCUMENTS

DE         195 20 579 A1    12/1995

(Continued)

OTHER PUBLICATIONS

International Search Report dated Feb. 16, 2007 w/English translation (six (6) pages).

(Continued)

*Primary Examiner*—Ha D. Ho
(74) *Attorney, Agent, or Firm*—Crowell & Moring LLP

(57) ABSTRACT

A method and device for determining a driving torque correction factor for compensating the driving torques of a drive unit including a first drive device and a second drive device, both of which act with their driving torque on a common drive shaft. The method includes specifying and setting a desired driving torque for one of the two drive devices, adjusting a brake torque for the other of the two drive devices to a brake torque value, which is equivalent to the value of the actual driving torque (that occurs on the basis of the desired driving torque) of one of the two drive devices, and determining the correction value as a function of the specified desired driving torque of the one drive device and as a function of the brake torque value of the other drive device, the brake torque value being adjusted at the time of the compensation of the torques.

8 Claims, 2 Drawing Sheets

U.S. PATENT DOCUMENTS

| | | | |
|---|---|---|---|
| 6,175,785 B1 | 1/2001 | Fujisawa et al. | |
| 6,907,325 B1 * | 6/2005 | Syed et al. | 701/22 |
| 7,204,564 B2 * | 4/2007 | Brown et al. | 303/7 |
| 2001/0017227 A1 | 8/2001 | Amano et al. | |
| 2004/0167694 A1 * | 8/2004 | Tamai | 701/41 |

FOREIGN PATENT DOCUMENTS

| | | |
|---|---|---|
| DE | 198 18 108 A1 | 11/1998 |
| EP | 0 787 619 B1 | 8/1997 |
| EP | 0 962 352 A2 | 12/1999 |
| EP | 0 965 475 B1 | 12/1999 |
| EP | 1 219 486 A2 | 7/2002 |
| EP | 1 316 464 A2 | 6/2003 |
| EP | 1 323 564 A2 | 7/2003 |
| EP | 1 132 657 B1 | 10/2004 |
| JP | 2000-297670 A | 10/2000 |

OTHER PUBLICATIONS

German Search Report dated Jul. 20, 2006 w/English translation of pertinent portion (ten (10) pages).

* cited by examiner

METHOD FOR DETERMINING A DRIVING TORQUE CORRECTION FACTOR FOR COMPENSATING COOPERATING DRIVING TORQUES OF DIFFERENT DRIVE DEVICES

CROSS REFERENCE TO RELATED APPLICATIONS

This application is a continuation of PCT International Application No. PCT/EP2006/011014, filed Nov. 16, 2006, which claims priority under 35 U.S.C. § 119 to German Patent Application No. 10 2005 055 001.0, filed Nov. 18, 2005, the entire disclosures of which are herein expressly incorporated by reference.

BACKGROUND AND SUMMARY OF THE INVENTION

The present invention relates to a method and device for determining a driving torque correction factor for compensating and/or for balancing the cooperating driving torques of different drive devices (and/or of driving torques acting on a common drive shaft).

There already exists a wide variety of drive units for motor vehicles, which exhibit two or more drive devices for generating a (total) driving torque, acting on a common drive shaft. In particular, hybrid vehicles, which are constructed in accordance with a so-called parallel hybrid system, usually exhibit an internal combustion engine and an electric motor. In this case their individual driving torques are added together to form a common total driving torque. The coordination of such drive units is usually accomplished by a drive management and consists in essence of model-based torque inputs of a control unit to the internal combustion engine and the electric motor.

An object of the invention is to provide a method for a drive unit with two individual drive devices that act with their individual driving torques on a common drive shaft. According to the invention, irregularities caused by a change in the torque distribution of the individual torques between the individual drive devices for maintaining a resulting total torque shall be reduced or even eliminated.

The invention is based on the knowledge that when drive units with different drive devices for generating individual driving torques (which act on a common drive shaft and/or which add up to a total driving torque (for example, a parallel hybrid system)) are operating, a different conversion ratio of the torque requirement (by the different drive devices) may result in a deviation of the driving torque, which is to be adjusted because of the load demand, and, thus, may result in an undesired bucking in the common drive train during a changeover between the drive units, during which the one drive unit takes over for the other drive device at least to some extent the load torque demanded. In other words, the (torque) difference between the different drive devices (the reason for the difference in day-to-day operation being based on a control for determining the torque distribution between the internal combustion engine and the electric motor or on the basis of module tolerances and production tolerances and on the basis of wear and tear) shall be equalized during the conversion of the desired values to the actual values (i.e., during the conversion of a desired driving torque to an actual driving torque) by means of a compensating method according to the invention. To this end the compensating method may be carried out after the production of such a drive unit (including two different drive devices) and/or after the production of a hybrid vehicle with such a drive unit and optionally even after the passage of a defined operating period of the drive unit.

This object is achieved by exemplary embodiments according to the present invention.

The first step in carrying out the inventive methods is to specify a desired driving torque for one of the two drive devices and then to adjust a brake torque, which acts against the specified desired driving torque, by means of the other drive device.

According to one exemplary embodiment, the setting of the brake torque takes place in a regulated manner in that the brake torque is adjusted as far as to a value that is equivalent to the value of the actual driving torque, which occurs owing to the specified desired driving torque. As soon as this torque uniformity has been set, no additional change in the speed of the common drive shaft will take place. The driving torques and/or the brake torques that were specified and/or set in this period of time are determined; and a correction value is determined as a function of the determined torques. The correction value may be calculated from the ratio of the specified desired torque to the adjusted brake torque at the time of the torque compensation.

According to another exemplary embodiment, the setting of the brake torque takes place in an unregulated manner in that only the desired driving torque of the one drive device is put opposite a predefined (known) brake driving torque of the other drive device; and subsequently the change in speed (speed gradient) that occurs in the common drive shaft is determined; and a correction value is determined as a function of this change in speed. In this case, when the correction value is determined, not only the speed gradient but also the masses of both drive units, which are to be put into motion (to be rotated), as well as optionally the specified desired driving torque and the adjusted known brake torque may be taken into consideration.

In both of the above described embodiments the correction value is determined uniformly for all operating points by determining just once a correction value at only one operating point or by determining individually the correction values for a plurality of operating points in order to prepare a correction value family of characteristics.

In each case the correction factor is determined advantageously as a function of the variables that influence the driving torque of at least one of the two different types of drive devices (internal combustion engine/electric motor). In particular, such variables as the ambient air pressure, the ambient temperature, the temperature of the internal combustion engine, the temperature of the electric motor, the temperature of the energy accumulator supplying the electric motor, are included in the process of determining the correction factor.

In a subsequent operation of the drive unit with its two different (individual) drive devices, this correction value and/or this correction value family of characteristics may always be used to specify the torque for the different (individual) drive devices. Taking into consideration the correction value, these torque inputs are also fulfilled with identical driving torque values.

Other objects, advantages and novel features of the present invention will become apparent from the following detailed description of the invention when considered in conjunction with the accompanying drawings.

BRIEF DESCRIPTION OF THE DRAWINGS

Exemplary embodiments of the invention are depicted in the drawings and described in detail below.

DETAILED DESCRIPTION OF THE DRAWINGS

Figure 1:
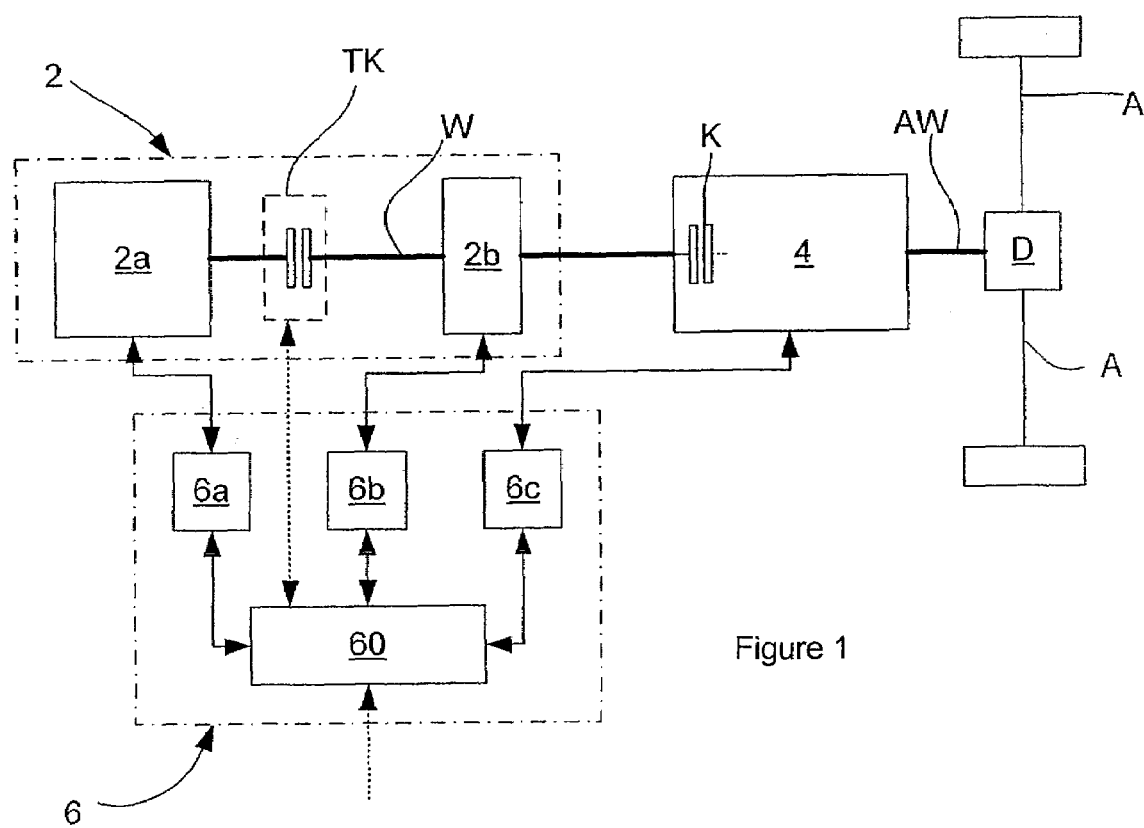
FIG. 1 is a schematic drawing of a configuration of a parallel hybrid drive system.

FIG. 1 depicts the drive train of a hybrid vehicle, which is designed as a parallel hybrid and in which the generated driving torques of the individual drive devices add up to a resulting total driving torque. The illustrated drive train includes a drive unit 2 with a first drive device 2a and a second drive device 2b. Both drive devices 2a, 2b act on a common drive shaft W. In this case, the first drive device 2a, which is designed, for example, as an internal combustion engine, is connected directly to the second drive device 2b, which is designed, for example, as an electric motor, by means of the common drive shaft W. In order to be able to guarantee, in addition, a purely electric drive, in which the internal combustion engine 2a does not have to be automatically entrained, a disengagable clutch TK may be arranged between the internal combustion engine 2a and the electric motor 2b. On the output side, the drive shaft W of the drive unit 2 is connected to a transmission device 4. On the output side, the transmission device 4 in turn is connected to a differential gear D by means of an output shaft AW in order to drive a driving axle A. In order to be able to operate the drive unit 2 even without an output-sided load, the transmission device 4 exhibits on the input side an additional disengagable clutch K, by means of which the transmission can be disengaged next to the driving axle A, which is to be driven. The inventive method, which is tended for determining a drive correction factor K and has the goal of compensating the actual driving torques of the first and second drive devices 2a, 2b (the actual driving torques may or may not be different and occur owing to an identical load demand), is carried out preferably with an open disengagable clutch K and with a closed disengagable clutch TK. Thus, in a state, in which the drive unit is isolated from a torque perspective, its two drive devices 2a, 2b are, however, rigidly connected together.

In order to carry out the inventive method(s) there is a control unit 6, by means of which the drive devices 2a, 2b can be actuated correspondingly. The control unit 4 is designed in such a manner that it can execute the method steps according to the present invention. In the illustrated embodiment the control unit 6 includes three lower ranking control modules 6a, 6b, 6c and a higher ranking control module 60. A first lower ranking control module 6a is used to actuate and communicate with the first drive device 2a (internal combustion engine), whereas a second control module 6b is used to actuate and communicate with the second drive device 2b (electric motor). A third lower ranking control module 6c is used to actuate the transmission 4 and/or the disengagable clutch K, which is integrated in the transmission, in order to uncouple the drive unit 2 from the rest of the drive train and to compensate with the aid of the inventive method. The coordination of the individual lower ranking control modules 6a, 6b, 6c is assumed by the higher ranking control module 60.

Figure 2:
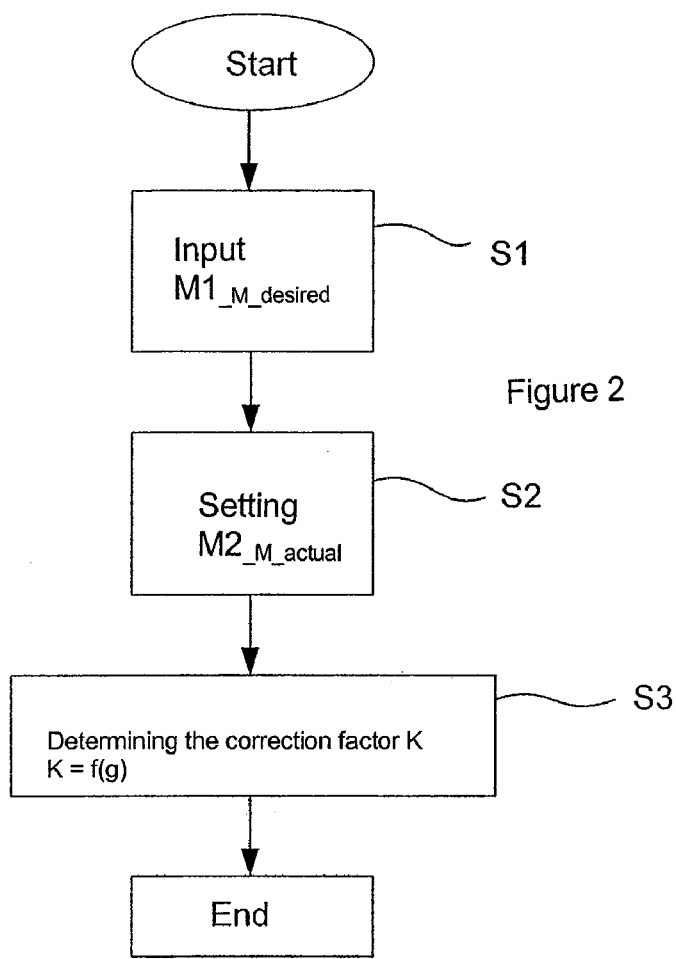
FIG. 2 is a program flow chart for schematic rendering of the inventive method, according to a first embodiment.

In order to carry out the inventive method, according to the second embodiment (see also FIG. 2), the control unit 6; 60, 6a specifies to the first drive device 2a a desired driving torque M1__M_desired, whereas the second drive device 2b is entrained without a specified load torque (M2__M_desired=0) (step S1). This input takes place by specifying to the first drive device 2a, in addition, a desired speed, which it sets on the basis of the speed input to the common drive shaft W. If the specified desired speed is reached, then in the next step S2 a defined permanent brake torque M2__M_actual is set. Only for the improbable event that both driving torques—the actual driving torque M1__M_actual, which is set on the basis of the desired driving torque M1__M_desired, and the permanently set defined (actual) brake torque M2__M_actual, which acts against the actual driving torque M1__M_actual—are the same size, a change occurs in the speed of the common drive shaft W so that this speed will no longer change. In this case the speed gradient G (G=Δn/Δt) is equal to 0 (zero). In the case that the brake torque M2__M_actual of the second drive device 2b is less than the actual driving torque M1__M_actual of the first drive device 2a, the actual driving torque occurring on the basis of the specified desired driving torque M1__M_desired, a change will occur in the resulting speed, which occurs at the time that the brake torque M2__M_actual is applied, in the form of an increase in the resulting speed in the direction of the accelerating drive device 2a. In this case that the brake torque M2__M_actual of the second drive device 2b is greater than the actual driving torque M1__M_actual of the first drive device 2a, the actual driving torque occurring on the basis of the specified desired driving torque M1__M_desired, a change will occur in the resulting speed, which occurs at the time that the brake torque M2__M_actual is applied, in the form of an increase in the resulting speed in the drive direction of the decelerating second drive device 2b. In all cases the correction factor K is determined as a function of the occurring speed variation and/or as a function of the resulting speed gradient G. Additional variables for determining the correction value K are, in particular, the targeted masses of the drive devices 2a, 2b, which are to be driven with the aid of the torque difference that occurs.

Figure 3:
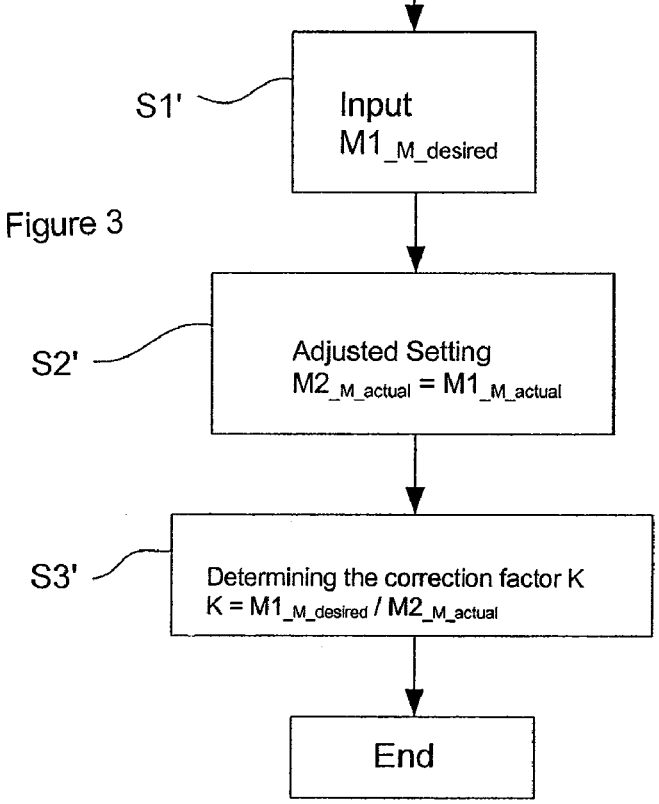
FIG. 3 is a program flow chart for schematic rendering of the inventive method, according to a second embodiment.

As explained above in the introduction, even in the first embodiment, (see also FIG. 3), the control unit 6; 60, 6a specifies to the first drive device 2a a desired driving torque M1__M_desired, whereas the second drive device 2b is entrained without a specified load torque (M2__M_desired=0) (step S1'). This input takes place by specifying to the first drive device 2a, in addition, a desired speed, which it sets on the basis of the speed input to the common drive shaft W. If the specified desired speed is reached, then in the next step S2' a brake torque M2__M_actual is adjusted to the actual driving torque M1__M_actual, which occurs on the basis of the input of the desired driving torque M1__M_desired. The control target is reached, when the adjusted speed remains constant. In this embodiment the correction value K is determined by placing the specified desired driving torque of the first drive device 2a in proportion to the (measured) brake torque of the second drive device 2b, the measured brake torque existing at the time that the control target is reached. The correction value K' is preferably the product of the equation: K'=M1__M_desired/M2__M_actual; (M2__M_actual adjusted driving torque of the second drive device at the time that the control target is reached).

The invention was explained above to some extent by means of the example of a first drive device 2a in the form of an internal combustion engine and a second drive device 2b in the form of an electric motor (which can be driven at least as a generator), but the invention is not to be restricted to this specific arrangement. Rather any arrangement is conceivable; in particular, arrangements between an internal combustion engine and an electric motor or between two electric motors are conceivable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a driving torque correction factor for compensating driving torques of a drive unit including a first drive device and a second drive device, both of which act with their driving torque on a common drive shaft, the method comprising the acts of:
specifying and setting a desired driving torque for one of the two drive devices;
adjusting a brake torque for the other of the two drive devices to a brake torque value, which is equivalent to a value of the actual driving torque of one of the two drive devices, the actual driving torque occurring on the basis of the desired driving torque; and
determining the correction factor as a function of the desired driving torque of the one drive device and as a function of the brake torque value of the other drive device, the brake torque value existing at the time of the compensation of the torques.

2. The method, as claimed in claim 1, wherein the correction factor is defined by the torque relationship:
the desired driving torque divided by the brake torque that was adjusted at the time of the torque compensation.

3. A method for determining a driving torque correction factor for compensating the driving torques of a drive unit including a first drive device and a second drive device, both of which act with their driving torque on a common drive shaft, the method comprising the acts of:
specifying and setting a desired driving torque for one of the two drive devices;
adjusting a brake torque, which acts against the desired driving torque, for the other of the two drive devices to a predetermined brake torque value; and
determining the correction factor as a function of a resulting speed gradient.

4. The method, as claimed in claim 3, wherein the correction factor is determined additionally as a function of the masses of the first drive device and the second drive device, the masses to be driven by the common drive shaft.

5. The method, as claimed in claim 1, wherein the method steps are carried out for a plurality of desired driving torques, which are to be specified, and a plurality of desired speeds, which are to be specified; and determined characteristic values are combined into a family of characteristics.

6. The method, as claimed in claim 2, wherein the method steps are carried out for a plurality of desired driving torques, which are to be specified, and a plurality of desired speeds, which are to be specified; and determined characteristic values are combined into a family of characteristics.

7. The method, as claimed in claim 4, wherein the method steps are carried out for a plurality of desired driving torques, which are to be specified, and a plurality of desired speeds, which are to be specified; and determined characteristic values are combined into a family of characteristics.

8. A device for determining a driving torque correction factor for compensating driving torques of a drive unit including a first drive device and a second drive device, both of which act with their driving torque on a common drive shaft, comprising:
a control unit including
a first control module configured to actuate and communicate with the first drive device;
a second control module configured to actuate and communicate with the second drive device;
a third control module configured to actuate at least one of a transmission and a disengagable clutch; and
a fourth control module configured to coordinate operation of the first, second, and third control modules,
wherein the first control module specifies and sets a desired driving torque for the first drive device;
wherein the second control module adjusts a brake torque for the second drive device to a brake torque value, which is equivalent to a value of the actual driving torque of one of the two drive devices, the actual driving torque occurring on the basis of the desired driving torque; and
wherein the correction factor is determined as a function of the desired driving torque of the first drive device and as a function of the brake torque value of the second drive device, the brake torque value existing at the time of the compensation of the torques.

* * * * *